US009106560B2

(12) United States Patent
Alpert et al.

(10) Patent No.: US 9,106,560 B2
(45) Date of Patent: *Aug. 11, 2015

(54) SOLVING NETWORK TRAFFIC CONGESTION USING DEVICE GROUPING (75) Inventors: Charles Jay Alpert, Austin, TX (US); Zhuo Li, Austin, TX (US); Chin Ngai Sze, Austin, TX (US); Yaoguang Wei, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 394 days.

This patent is subject to a terminal disclaimer.

(21) Appl. No.: 13/612,392

(22) Filed: Sep. 12, 2012

(65) Prior Publication Data

US 2014/0071827 A1    Mar. 13, 2014

(51) Int. Cl.
*H04W 28/10* (2009.01)
*H04L 12/803* (2013.01)
*H04L 12/707* (2013.01)
*H04L 12/703* (2013.01)

(52) U.S. Cl.
CPC .............. *H04L 47/125* (2013.01); *H04L 45/22* (2013.01); *H04L 45/28* (2013.01)

(58) Field of Classification Search
CPC ....... H04L 45/22; H04L 45/28; H04L 47/125; G06F 17/5077; G06F 17/50
USPC .......................................... 370/237, 331–335
See application file for complete search history.

(56) References Cited

U.S. PATENT DOCUMENTS

| 6,175,950 | B1 | 1/2001 | Scepanovic et al. |
| 6,253,363 | B1 | 6/2001 | Gasanov et al. |
| 6,260,183 | B1 | 7/2001 | Raspopovic et al. |
| 6,289,495 | B1 | 9/2001 | Raspopovic et al. |
| 7,096,448 | B2 | 8/2006 | Teig et al. |
| 7,299,442 | B2 | 11/2007 | Alpert et al. |
| 8,112,733 | B2 | 2/2012 | Frankle et al. |
| 8,341,586 | B2 * | 12/2012 | Frankle et al. ................. 716/126 |
| 2001/0003843 | A1 | 6/2001 | Scepanovic et al. |
| 2009/0150070 | A1 * | 6/2009 | Alewine et al. ............... 701/207 |

OTHER PUBLICATIONS

Chen et al., High-Performance Global Routing witFast Overflow Reduction, published in 2009, IEEE, 6B-3s.*

(Continued)

*Primary Examiner* — Jae Y Lee
*Assistant Examiner* — Jean F Voltaire
(74) *Attorney, Agent, or Firm* — Garg Law Firm, PLLC; Rakesh Garg; William J. Sock (57) ABSTRACT

A method, system, and computer program product for solving a network traffic congestion problem are provided in the illustrative embodiments. Using an application executing using a processor and a memory in a data processing system, a congested network route section is selected from a set of congested network route sections. A set of congesting devices is selected, where the set of congesting devices causes congestion in the selected congested network route sections by using the selected congested network route section. A vacancy data structure corresponding to the selected congested network route section is populated. A subset of the set of the congesting devices is selected. The subset of the set of the congesting devices is rerouted to a candidate network route section identified in the vacancy data structure.

20 Claims, 6 Drawing Sheets (56) References Cited

OTHER PUBLICATIONS

Chen et al. (High Performance Global Routing with Fast Overview Reduction), Published in 2009, 6 pages.*

Y.-J. Chang et al. NTHU-Route 2.0: A fast and stable global router. In Proc. ICCAD, pp. 338-343, 2008.

H.-Y. Chen et al. High-performance global routing with fast overflow reduction. In Proc. ASPDAC, pp. 582-587, 2009.

C. Minsik et al. BoxRouter 2.0: Architecture and implementation of a hybrid and robust global router. In Proc. ICCAD, pp. 503-508, 2007.

Y. Xu et al. FastRoute 4.0: Global router with efficient via minimization. In Proc. ASPDAC, pp. 576-581, 2009.

M. D. Moffitt. MaizeRouter: Engineering an effective global router. IEEE Trans. on CAD, 27(11):2017-2026, 2008.

* cited by examiner

SOLVING NETWORK TRAFFIC CONGESTION USING DEVICE GROUPING

BACKGROUND

1. Technical Field

The present invention relates generally to a method, system, and computer program product for routing wireless network traffic. More particularly, the present invention relates to a method, system, and computer program product for solving network traffic congestion problems using device grouping.

2. Description of the Related Art

Network traffic congestion occurs when the number of devices using a network path exceeds a device capacity of that network path. Network traffic congestion occurs in wireless networks when a larger than threshold number of wireless devices use a wireless network path to a wireless service point, such as, for example, a cell tower, a base station, a wireless access point, or a wireless switch. For example, more than a threshold number of cell phones utilizing a cell tower can cause network traffic congestion in a network path, which includes the cell tower. More than a threshold number of portable computing devices accessing a wireless access point can cause network traffic congestion at the access point. Generally, any type of wireless device using a compatible wireless network can cause network traffic congestion in a network path in that wireless network.

SUMMARY

The illustrative embodiments provide a method, system, and computer program product for solving network traffic congestion using device grouping. An embodiment for solving a network traffic congestion problem selects, using an application executing using a processor and a memory in a data processing system, a congested network route section from a set of congested network route sections. The embodiment selects a set of congesting devices, wherein the set of congesting devices causes congestion in the selected congested network route sections by using the selected congested network route section. The embodiment populates a vacancy data structure corresponding to the selected congested network route section. The embodiment selects a subset of the set of the congesting devices. The embodiment reroutes the subset of the set of the congesting devices to a candidate network route section identified in the vacancy data structure.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

A network traffic routing tool is a software application to compute a network route for communicating with a wireless device (device). For example, a mobile communications network management application may have a routing component that generates the routes for the mobile devices based on the information about the devices' locations and cell tower locations the devices are to reach.

Consider a commuter as an example. The commuter's device's path of travel and destinations can be known based on the commuter's travel pattern history available to the mobile communication network provider. A set of waypoints or wireless service points, such as base stations, are computable from network map data to identify the cells the commuter's device is likely to traverse.

As another example, assume the device is a portable computer, such as a tablet computing device. The device's destination can be computed from other available information, such as a location of a meeting on a user's calendar, to which the user might be carrying the device at or about the time of the meeting. Knowing the present location and a destination of the device, a network traffic routing tool can compute a route via identifiable wireless service points, such as access points or switches, along the route.

When several devices use a wireless network, at least some parts of the network routes of at least some of the devices coincide in time and space. For example, when several subscribers of a wireless network are travelling at the same time in a given part of a town, at least some devices are likely to be on the same section of a highway at the same time, utilizing the same wireless service points.

A section of a network route is portion of the network route serviced by a wireless service point. Within the scope of the illustrative embodiments, the network route can be in any wireless network environment, such as in a cellular voice network, cellular data network, or Wi-Fi network. A section of a network route can be bound by any two wireless service points on the network route. Several embodiments are described using mobile communications networks such as cellular communications networks, mobile devices such as smartphones, and cellular network maps, only as examples for the clarity of the description and not as limitations on the illustrative embodiments.

Typically, network route sections, such as a road section between two cell towers, are designed for predetermined network capacity to keep network traffic to and from devices flowing at or above a threshold rate. If more devices use the network section than the network capacity, the network traffic flow reduces below the threshold rate, resulting in congestion.

The network capacity of the network section, or an equivalent thereof, exceeding which results in congestion, is called a congestion threshold.

The illustrative embodiments recognize that solving a network congestion problem is time consuming and computationally expensive. The illustrative embodiments further recognize that the present methods for solving a network congestion problem are wasteful of computing resources for at least two reasons—first, even if the congestion problem requires rerouting of several devices away from a congested route section, the present methods attempt to reroute one device at a time. Second, the present methods do not leverage the computations performed in rerouting one device for reducing the computation load of rerouting another device.

The illustrative embodiments used to describe the invention generally address and solve the above-described problems and other problems related to solving network congestion problems in network traffic routing. The illustrative embodiments provide a method, system, and computer program product for solving network traffic congestion using device grouping.

While some embodiments are described with respect to certain numbers of devices and network route sections, an implementation may use an embodiment to solve for any number of devices and network route sections without departing the scope of the invention. For example, an implementation of an embodiment may route a set of all devices that exceed a network route section's capacity together, or in smaller subsets, without departing the scope of the invention. As another example, an implementation of an embodiment can consider not just one network route section in the manner described herein, but additional network route sections that a device's planned network route may be passing through, because congestion generally affects contiguous network route sections, within the scope of the illustrative embodiments.

The illustrative embodiments are described with respect to certain network traffic environments or devices only as examples. Such descriptions are not intended to be limiting on the invention. For example, an illustrative embodiment described with respect to cellular environment can be implemented with respect to a Wi-Fi environment using an embodiment.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention. As another example, an embodiment described using a table can be implemented using another data structure within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
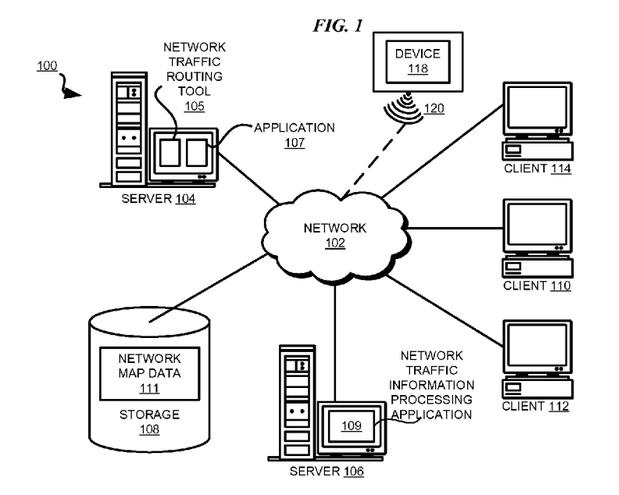
FIG. 1 depicts a pictorial representation of a network of data processing systems in which illustrative embodiments may be implemented.
Figure 2:
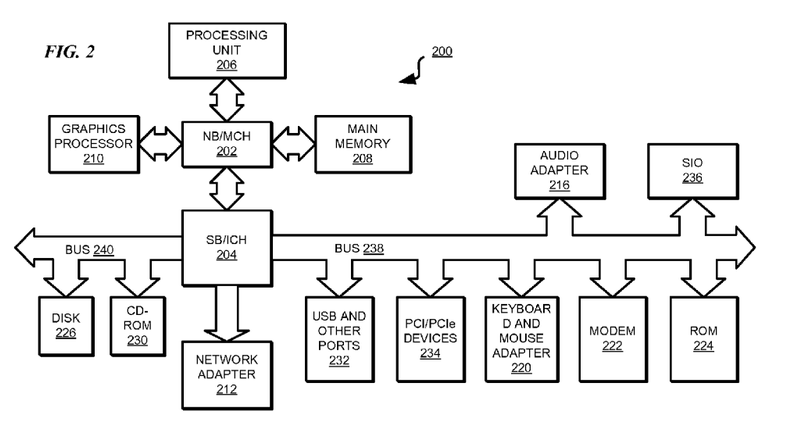
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Any data processing system, such as server 104, may include network traffic routing tool 105 that may be improved using an embodiment. Network traffic routing tool 105 may be any suitable software application for computing a network route for a device. Application 107 may be any combination of hardware and software usable for implementing an embodiment of the invention such that the embodiment is usable with network traffic routing tool 105 for solving network congestion problems using device grouping and information sharing. Network traffic information processing application 109 in server 106 receives network traffic information or information indicative of network traffic in a given network route section. Network traffic information processing application 109 correlates the network traffic information with devices using the network route section. Application 107 uses the correlated network traffic information together with network map data 111 in storage 108 to perform a function according to an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In addition, device 118 may be a wireless device as described earlier. Device 118 is able to communicate with network 102 using a suitable wireless communication 120.

An embodiment can be implemented in device 118. For example, device 118 can include network traffic routing tool 105, application 107, network traffic information processing application 109, and network map data 111 to perform congestion aware rerouting and provide movement information to share with other instances of device 118 in the manner of an embodiment.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments. Data processing system 200 is also representative of a device, such as device 118 in FIG. 1, in which computer usable program code or instructions implementing the processes of the illustrative embodiments may be located for an illustrative embodiment. Data processing system 200 is also representative of an embedded device, such as a wireless device embedded in a vehicle in the form of device 118 in FIG. 1, in which computer usable program code or instructions implementing the processes of the illustrative embodiments may be located for the illustrative embodiments. Data processing system 200 is described as a computer only as an example, without being limited thereto. Implementations in the form of device 118 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs, including network traffic routing tool 105, application 107, network traffic information processing application 109, or a combination thereof, are located on one or more storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, a program code according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3A:
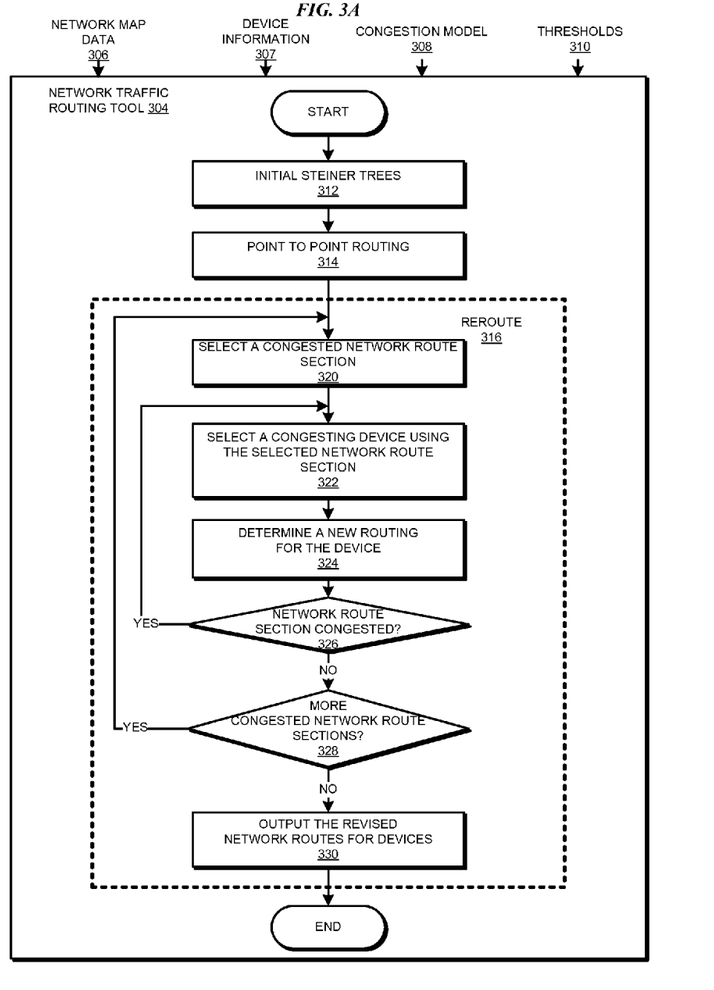
FIG. 3A depicts a block diagram of an example rerouting process that can be improved using an illustrative embodiment.

With reference to FIG. 3A, this figure depicts a block diagram of an example rerouting process that can be improved using an illustrative embodiment. Network traffic routing tool 304 is an example existing network traffic routing tool, such as network traffic routing tool 105 in FIG. 1, that can be improved to solve network traffic congestion problems using device grouping and information sharing according to an embodiment. Any rerouting function depends on the notion that a device can be serviced from any of the several wireless service points that provide coverage in the location of the device.

Network traffic routing tool 304 receives certain aspects of one or more network routes in the form of inputs. Network map data 306 and device information 307 provides network traffic routing tool 304 the information that network traffic routing tool 304 needs to perform the routing. Congestion model 308 provides network traffic routing tool 304 information about route section capacities, demand on the section, i.e., number of devices using the section, and blockage information, such as network load that cannot be moved from the section. A blockage reduces the true capacity of the route section. Demand of a route section is a measure of existing congestion in the route section by accounting for the capacity, the blockages, and the true capacity of the route section.

Thresholds 310 can be any set of numbers and type of thresholds suitable for a given implementation. For example, in one embodiment, thresholds 310 include a congestion threshold for each route section and a route-length bound for each device. A congestion threshold is a limit on how congested a route section is allowed to become in an acceptable routing solution. For example, a routing specification may require that no route section in a region be congested more than ninety percent for the route computation to be acceptable.

A route-length bound is a limit on the length of a route or route segment. A route-length bound is indicative of, such as by being proportional to a signal strength bound. For example, in one embodiment, a route-length bound may specify a signal strength constraint, which a critical route should always meet in an acceptable route computation.

Network traffic routing tool 304 delivers an acceptable network route in three broad steps. Network traffic routing tool 304 constructs an initial Steiner tree using the given network map data and device information, such as destinations and expected wireless service points (step 312). Network traffic routing tool 304 performs point-to-point routing for the devices (step 314). Network traffic routing tool performs reroute operations to solve any network traffic congestion problems (step 316).

As described earlier, a prior art network traffic routing tool 304 disadvantageously performs step 316, one congesting device at a time, searching the complete set of potential rerouting solutions for rerouting each congesting device. Presently, network traffic routing tool 304 selects a congested route section (step 320). Network traffic routing tool 304 select a congesting device on the selected route section (step 322).

Network traffic routing tool 304 determines a new route for the congesting device, to wit, finds a new wireless service point on the network map for servicing the congesting device, (step 324). Prior art network traffic routing tool 304 does not reuse any subset of the new network route segments, found during a previous iteration of finding a new network route, for another congesting device. Accordingly, in determining the new routing of step 324 for a particular congesting device, network traffic routing tool 304 performs the determination anew for the congesting device, without the benefit of any similar computations network traffic routing tool 304 may have previously performed for another congesting device.

Network traffic routing tool 304 determines whether the network route section remains congested after rerouting the selected congesting device (step 326). If the network route section remains congested, to wit, if more congesting device present on the network route section have to be rerouted ("Yes" path of step 326, network traffic routing tool 304 returns to step 322 and selects another congesting device for reroute step 316.

If the selected network route section is no longer congested, to wit, all congesting devices have been rerouted to other network route sections ("No" path of step 326), network traffic routing tool 304 determines whether more congested network route sections remain to be solved in this manner (step 328). If more congested route sections remain ("Yes" path of step 328), network traffic routing tool 304 returns to step 320 and selects another congested network route section to solve for network traffic congestion in this manner.

If no more congested route sections remain ("No" path of step 328), network traffic routing tool 304 outputs the revised paths or routes of the devices (step 330). Thus, as the illustrative embodiments recognize and solve, prior art network traffic routing tool 304 incurs unnecessary computations in generating the reroutes that meets the congestion threshold, route-length bound, and other constraints on the acceptability of a routing solution.

Figure 3B:
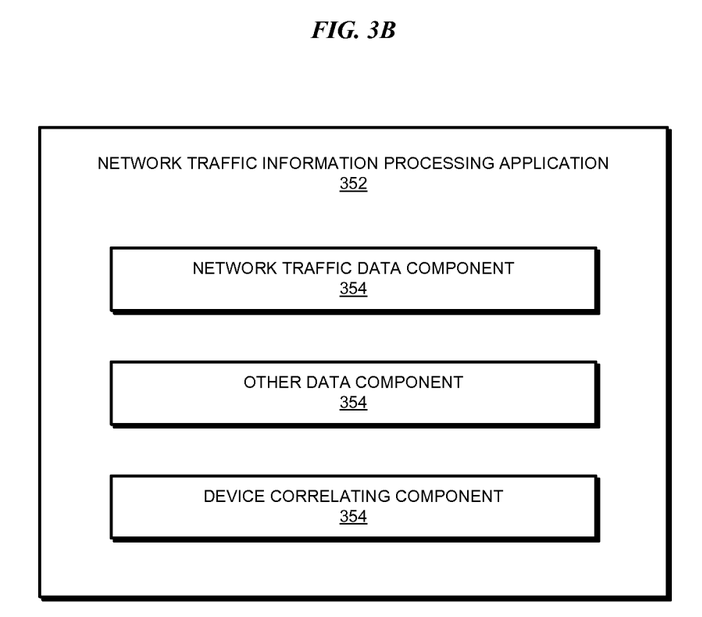
FIG. 3B depicts a block diagram of a network traffic information processing application that is usable in conjunction with an illustrative embodiment.

With reference to FIG. 3B, this figure depicts a block diagram of a network traffic information processing application that is usable in conjunction with an illustrative embodiment. Application 352 is usable as network traffic information processing application 109 in FIG. 1. In one embodiment, application 352 can be included within application 107 in FIG. 1.

Application 352 includes component 354 to receive network traffic data from an existing network traffic monitoring service. For example, component 354 may receive data that informs application 352 that a particular network route section is severely congested, moderately congested, or not congested. Such congestion rating of a network route section can be translated into values relative to one or more congestion thresholds.

Application 352 includes component 356 to receive data that can be translated to correspond to network traffic along a route section. For example, component 356 may receive a volume of vehicular traffic on a road corresponding to a network route section. Generally, the higher the vehicular traffic, the higher the wireless data volume is likely to be.

Application 352 includes component 358 to receive device identifying data. Component 358 is further configured to correlate network traffic data from component 354, data from component 356, or a combination thereof, with the device data to determine which devices are present on a network route section. For example, a network traffic monitoring service may deliver not only the volume information but also subscriber information to component 356. Component 358 is configurable to access data that correlates subscribers with devices. Accordingly, application 352 can provide devices information 307 in FIG. 3A, which is sufficient to learn which devices are using which network route sections, including congested network route sections.

Figure 4:
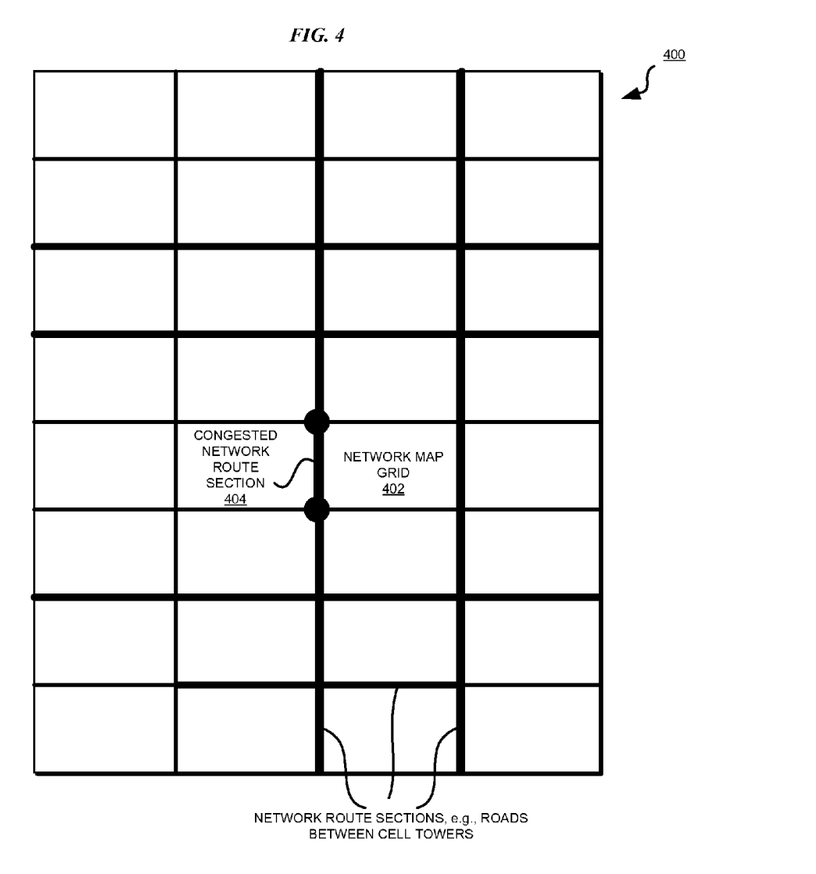
FIG. 4 depicts a block diagram of routing on a network map grid in which network traffic congestion can be removed in accordance with an illustrative embodiment.

With reference to FIG. 4, this figure depicts a block diagram of routing on a network map grid in which network traffic congestion can be removed in accordance with an illustrative embodiment. Route layout 400 is any suitable depiction of network routes of several devices, such as by overlaying the network routes on a cell sites map. Layout 400 includes several blocks as show, each of which is a grid, such as for example, network map grid 402. A route section occupies an edge of a grid. An improved network traffic routing tool uses layout 400, such as a part of inputs 306 and 307, to produce the revised routes according to an embodiment.

Network route section 404 is an example network route section that is congested. For example, network route section 404 may have a capacity of 10 devices, six of which cannot be placed there because of blockages, leaving a true capacity of four for network route section 404. As an example, consider that seven devices (not shown) are using route section 404. In this example, assuming a congestion ratio of one hundred percent being acceptable, at least three devices out of the seven devices have to be rerouted to other network route sections in layout 400.

Figure 5:
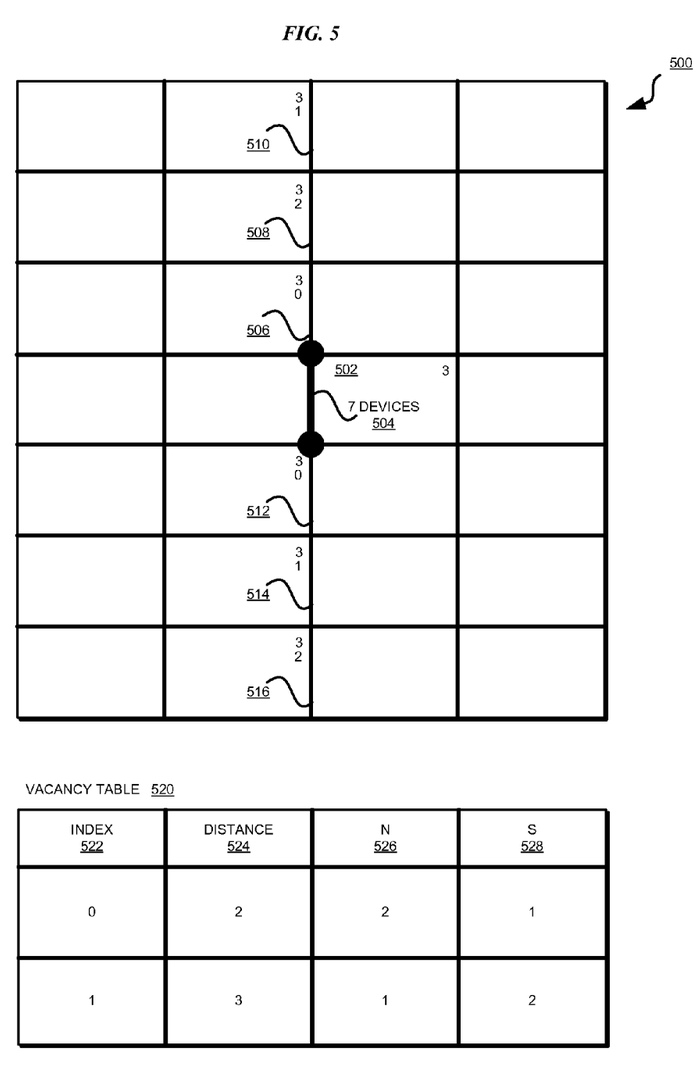
FIG. 5 depicts a block diagram of a configuration for solving a network traffic congestion problem using device groupings and information sharing in accordance with an illustrative embodiment.

With reference to FIG. 5, this figure depicts a block diagram of a configuration for solving a network traffic congestion problem using device groupings and information sharing in accordance with an illustrative embodiment. Layout 500 is analogous to layout 400 in FIG. 4. Grid block 502 is similar to network map grid 402, and network route section 504 is similar to network route section 404 in FIG. 4, respectively. As in the example used to describe FIG. 4, seven devices are using route section 504 causing a network traffic congestion by at least three devices (making at least three devices congesting devices), depending on the given congestion ratio.

Without implying a limitation thereto, an example manner of denoting a network route section's true capacity and available empty tracks (available capacity for additional devices) is shown in FIG. 5. Network route sections are depicted in layout 500 with their true capacity noted as the top number in the top right corner of the grid block on each network route section's left side. Available number of empty tracks for a network route section, where a congesting device from another network route section can be rerouted, is shown as the second number below that top number. For example, network route section 506 has a (true) capacity of three devices, and none of the three tracks (0) is available for rerouting a congesting device from another network route section. Likewise, network route section 508 has a true capacity of 3 with 2 available empty tracks; network route section 510 has a true capacity of 3 with 1 available empty track; network route section 512 has a true capacity of 3 with 0 available empty tracks; network route section 514 has a true capacity of 3 with 1 available empty track; and network route section 516 has a true capacity of 3 with 2 available empty tracks.

An improved network traffic routing tool according to an embodiment, such as network traffic routing tool 304 modified using an embodiment, can use any of route sections 506, 508, 510, 512, 514, or 516 for a modified rerouting of one or more of the congesting devices of network route section 504. In performing the rerouting of the set of three congesting devices of network route section 504, the improved network traffic routing tool reroutes groups or subsets of the congesting devices together. For example, in one embodiment, if network route section 508 were to have three tracks available (as different from the depicted availability of 2), the improved network traffic routing tool would reroute the set of three congesting devices from network route section 504 to network route section 508 together. In another embodiment, according to the depicted availabilities in network route sections 508 and 514, the improved network traffic routing tool would reroute a subset of two out of the three congesting devices from network route section 504 to network route section 508 together, and reroute the remaining one congesting device in the set from network route section 504 to network route section 514.

Having located network route section 504 as a congested route section, an embodiment performs an analysis of candidate network route sections where some or all of the congesting devices of network route section 504 can be moved. The embodiment records the results of the analysis in vacancy table 520. In effect, vacancy table 520 is a view of the candidate network route sections, which allows the improved network traffic routing tool to analyze the vacancy information prior to actual rerouting, and organize the vacancy information such that the information is sharable for rerouting subsets of a set of congesting devices.

Vacancy table 520 uses columns 522-528 to store the available track information of network route sections neighboring network route section 504, which can service the devices that are using network route section 504, such as network route sections 506-516, indexed by distance from network route section 504. As an example, vacancy table 520 stores index in column 522, distance from network route section 504 in column 524, in North direction from network route section 504 under column 526, and in South direction from network route section 504 under column 528. Directions North and South are used in this example because network route section 504 runs North-South and devices using network route section 504 would have to be rerouted using a network route section neighbor to the North or South. In another embodiment, if a congesting device on network route section 504 were to be rerouted to the East or West, vacancy table 520 can be adjusted accordingly.

Furthermore, in another embodiment, rerouting in a particular direction can be weighted so that the improved network traffic routing tool prefers a higher weighted direction to a lower weighted direction. For example, in one example scenario, a device traveling North may want to continue traveling North after the rerouting instead of taking a scenic detour to the South before proceeding North again. In such a case, a network route section to the North of route section 504 may be weighted higher than a network route section to the South of network route section 504 so that the rerouting selects, if other conditions allow, the section to the North over the section to the South.

In the depicted example, vacancy table 520 has no indexed entry at distance 1 because network route sections 506 and 512, which are at distance 1 from route section 504 to the North and to the South respectively, have zero availability and are not candidates for rerouting. At index 0, information about network route sections 508 and 514 is indicated, both of which are at distance 2 from network route section 504. Network route section 508 at distance 2 has an availability of two to the North, and network route section 514 at distance 2 has an availability of one to the South. Similarly, at index 1, information about network route sections 510 and 516 is indicated, both of which are at distance 3 from network route section 504. Network route section 510 at distance 3 has an availability of one to the North, and network route section 516 at distance 3 has an availability of two to the South.

Additional indices, such as 2, 3, 4, and so on, are not shown in column 522, but if present, would similarly show the information of the candidate network route sections farther than distance 3 to the North and to the South from network route section 504. If a horizontal network route section of grid block 502 were the cause of network traffic congestion (not shown), vacancy information of network route sections to the East and West of that horizontal network route section of grid block 502 would be similarly depicted using a variation of vacancy table 520.

Vacancy table 520 is depicted as a table only as an example, without implying a limitation on the structure for storing similar information. An implementation can use any suitable data structure to store the vacancy information in the depicted manner or another similarly usable manner within the scope of the illustrative embodiments.

Once vacancy table 520 is constructed for a selected network route section, such as network route section 504, the improved network traffic routing tool need not spend computing resources for identifying candidate network route sections for rerouting congesting devices of network route section 504, one congesting device at a time. With the benefit of vacancy table 520, the improved network traffic routing tool can identify a subset of congesting devices according to some common characteristic, such as a common subscriber groups, common destination or wireless service points, similar lengths of routes or detours, similar signal strength requirement constraints (if available, e.g., via device 118 in FIG. 1), similar preferences for rerouting (if available, e.g., via device 118 in FIG. 1), differences between a device's route length and the route-length bound of two congesting devices, or any other suitable selection criteria. For example, knowing the difference between the device's route length and route-length bound allows the improved network traffic routing tool to limit the rerouting options to only those candidate route sections in vacancy table 520 that are distanced from route section 504 at most by that difference. The improved network traffic routing tool can then select a suitable candidate route section and reroute the subset of congesting devices together instead of one at a time.

For the remaining congesting devices, the improved network traffic routing tool need not explore all neighboring network route sections for identifying candidate route sections. Vacancy table 520 can be reused, to wit, the information in vacancy table 520 can be shared, for rerouting other congesting devices away from network route section 504.

Thus, a network traffic routing tool improved with an embodiment can solve a network traffic congestion problem using device grouping and information sharing. At least for this reason, an improved network traffic routing tool according to an embodiment can solve the network traffic congestion problem in a more efficient manner as compared to a prior art network traffic routing tool.

Figure 6:
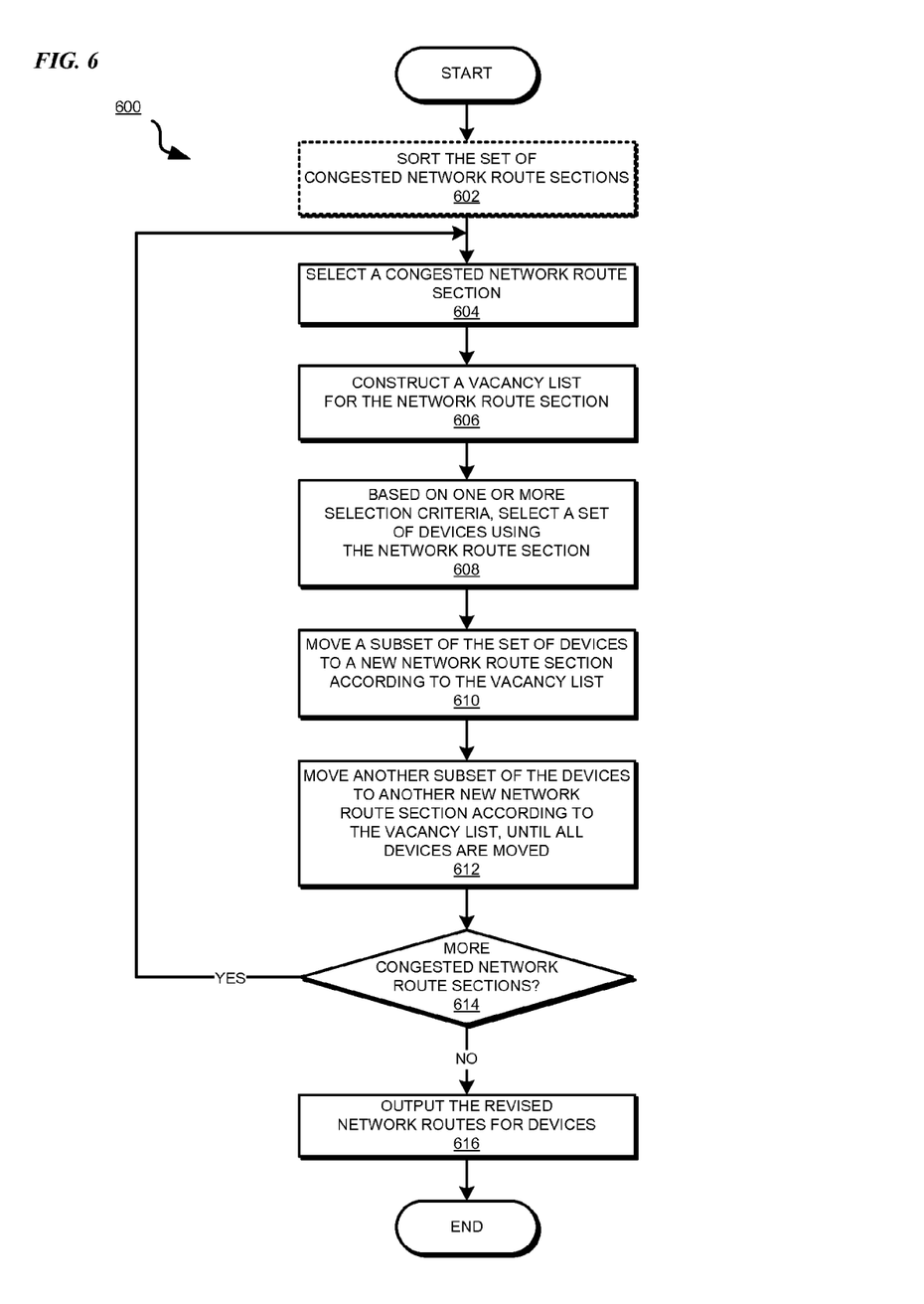
FIG. 6 depicts a flowchart of an example process of solving a network traffic congestion problem using device grouping and information sharing in accordance with an illustrative embodiment.

With reference to FIG. 6, this figure depicts a flowchart of an example process of solving a network traffic congestion problem using device grouping and information sharing in accordance with an illustrative embodiment. Process 600 can be implemented as reroute step 316 of network traffic routing tool 304 in FIG. 3A to form an improved network traffic routing tool according to an embodiment. For example, process 600 can be implemented as application 107 in FIG. 1, and may execute in conjunction with network traffic routing tool 105 in FIG. 1.

Process 600 begins by selecting a congested network route section from a layout (step 604). Optionally, before performing step 604, an embodiment of process 600 sorts an identified set of congested network route sections in the layout (step 602). In one embodiment, process 600 performs the selection of step 604 in the order of highest congestion to lowest congestion according to the sorting of optional step 602.

Process 600 constructs a vacancy list, such as vacancy list 520 in FIG. 5, for a selected network route section that is causing the network traffic congestion (step 606). Based on one or more selection criteria, process 600 selects a set of devices using the congested route section (step 608).

For example, out of the seven example devices at network route section 504 in FIG. 5, process 600 may select those three to reroute whose signal strengths are greater than a signal strength bound by a threshold number of units. Selecting in this manner, process 600 can explore candidate network route sections farther from the congested network route section of step 604.

The example criterion of the difference between a signal strength and signal-strength bound is not intended to be a limitation on the criteria usable for selecting congesting devices that should be rerouted. Those of ordinary skill in the art will be able to select congesting devices for rerouting using other criteria, such as timing criticality, and such other criteria are contemplated within the scope of the illustrative embodiments.

Process 600 moves (reroutes) a subset of the set of devices selected in step 608 according to the vacancy table (step 610). In one embodiment, the subset includes all members of the set. In another embodiment, the subset includes some members of the set. If the subset moved in step 610 leaves some devices to be moved in the set, process 600 moves another subset of the set of congesting devices in a similar manner using the vacancy table until all devices in the set are moved (step 612).

Process 600 determines whether more congested network route sections remain to be solved in this manner (step 614). If more congested network route sections remain ("Yes" path of step 614), process 600 returns to step 604. If all network traffic congestion problems have been solved ("No" path of step 614), process 600 outputs the revised network routes for the devices (step 616). Process 600 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for solving network traffic congestion problems using device grouping and information sharing. Using an embodiment, an improved network traffic routing tool can reroute congesting devices away from a congested network route section in a more efficient manner as compared to a prior art network traffic routing tool. The candidate network route sections for rerouting are identified and cataloged in a vacancy data structure. The congesting devices are selected according to some criteria. A subset of the set of congesting devices is selected for rerouting according to certain criteria and rerouted to one or more of the candidate network route sections according to the vacancy data structure.

Furthermore, an embodiment can further improve the rerouting process by employing additional operations. For example, congestion usually afflicts contiguous network route sections. Therefore, an embodiment can move a congesting device to an empty track in a candidate network route section, and then check to determine whether congestion exists in other adjacent network route sections. If the embodiment finds congestion in such adjacent network route sections, the embodiment can move the device to a farther candidate network route section to alleviate congestion in the adjacent network route sections as well. For future movements of other congesting devices, the embodiment can first check whether a network route section adjacent to the congested network route section along the section's direction is also has a congested network route section. Using this information, the embodiment can choose to move the congesting device farther than the adjacent network route section and avoid a contiguous congested region of the layout.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer usable storage device," "computer readable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for solving a network traffic congestion problem, the method comprising:
    selecting, using an application executing using a processor and a memory in a data processing system, a congested network route section from a set of congested network route sections;
    selecting a set of congesting devices, wherein the set of congesting devices causes congestion in the selected congested network route sections by using the selected congested network route section;
    populating a vacancy data structure corresponding to the selected congested network route section, wherein the vacancy data structure stores available track information of a set of network route sections and wherein the available track information is indexed by a distance between the selected congested network route section and another network route section in the set of network route sections;
    selecting a subset of the set of the congesting devices; and
    rerouting the subset of the set of the congesting devices to a candidate network route section identified in the vacancy data structure.

2. The computer implemented method of claim 1, wherein the rerouting the subset omits evaluating a possibility of moving a congesting device in the subset to a neighboring network route section of the selected congested network route section because the neighboring network route section is not identified in the vacancy data structure, further comprising:
    rerouting a second subset of the set of the congesting devices to a second candidate network route section identified in the vacancy data structure.

3. The computer implemented method of claim 1, further comprising:
    determining whether a congesting device in the subset is causing congestion in a network route section neighboring the selected congested network route section; and
    skipping, responsive to the determining being affirmative, the network route section neighboring the selected congested network route section for the rerouting.

4. The computer implemented method of claim 1, wherein the populating comprises:
    identifying, in the vacancy data structure, the candidate network route section neighboring the selected congested network route section such that a direction of the candidate network route section relative to the selected congested network route section corresponds to an orientation of the selected congested network route section;
    recording in the vacancy data structure a distance between the candidate network route section and the selected congested network route section; and
    recording in the vacancy data structure a number of available empty tracks in the candidate network route section.

5. The computer implemented method of claim 1, further comprising:
    selecting the set of congesting devices from a set of devices using the selected congested network route section, wherein the set of congesting devices is a subset of the set of devices, and wherein the selecting employs a selection criterion.

6. The computer implemented method of claim 5, wherein the selection criterion for selecting the set of congesting devices causes that device in the set of devices to be selected as a congesting device whose signal strength exceeds a signal-strength bound by a threshold value.

7. The computer implemented method of claim 1, further comprising:
    identifying the set of congested network route sections; and
    sorting the set of congested network route sections.

8. A computer usable program product comprising a computer usable storage device including computer usable code for solving a network traffic congestion problem, the computer usable code comprising:
    computer usable code for selecting, using an application executing using a processor and a memory in a data processing system, a congested network route section from a set of congested network route sections;
    computer usable code for selecting a set of congesting devices, wherein the set of congesting devices causes congestion in the selected congested network route sections by using the selected congested network route section;
    computer usable code for populating a vacancy data structure corresponding to the selected congested network route section, wherein the vacancy data structure stores available track information of a set of network route sections and wherein the available track information is indexed by a distance between the selected congested network route section and another network route section in the set of network route sections;
    computer usable code for selecting a subset of the set of the congesting devices; and
    computer usable code for rerouting the subset of the set of the congesting devices to a candidate network route section identified in the vacancy data structure.

9. The computer usable program product of claim 8, wherein the rerouting the subset omits evaluating a possibility of moving a congesting device in the subset to a neighboring network route section of the selected congested network route section because the neighboring network route section is not identified in the vacancy data structure, further comprising:
    computer usable code for rerouting a second subset of the set of the congesting devices to a second candidate network route section identified in the vacancy data structure.

10. The computer usable program product of claim 8, further comprising:
    computer usable code for determining whether a congesting device in the subset is causing congestion in a network route section neighboring the selected congested network route section; and computer usable code for skipping, responsive to the determining being affirmative, the network route section neighboring the selected congested network route section for the rerouting.

11. The computer usable program product of claim 8, wherein the populating comprises:

computer usable code for identifying, in the vacancy data structure, the candidate network route section neighboring the selected congested network route section such that a direction of the candidate network route section relative to the selected congested network route section corresponds to an orientation of the selected congested network route section;

computer usable code for recording in the vacancy data structure a distance between the candidate network route section and the selected congested network route section; and computer usable code for recording in the vacancy data structure a number of available empty tracks in the candidate network route section.

12. The computer usable program product of claim 8, further comprising:

computer usable code for selecting the set of congesting devices from a set of devices using the selected congested network route section, wherein the set of congesting devices is a subset of the set of devices, and wherein the selecting employs a selection criterion.

13. The computer usable program product of claim 12, wherein the selection criterion for selecting the set of congesting devices causes that device in the set of devices to be selected as a congesting device whose signal strength exceeds a signal-strength bound by a threshold value.

14. The computer usable program product of claim 8, further comprising:

computer usable code for identifying the set of congested network route sections; and computer usable code for sorting the set of congested network route sections.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A data processing system for solving a network traffic congestion problem, the data processing system comprising:

a storage device including a storage medium, wherein the storage device stores computer usable program code; and a processor, wherein the processor executes the computer usable program code, and wherein the computer usable program code comprises:

computer usable code for selecting, using an application executing using a processor and a memory in a data processing system, a congested network route section from a set of congested network route sections;

computer usable code for selecting a set of congesting devices, wherein the set of congesting devices causes congestion in the selected congested network route sections by using the selected congested network route section;

computer usable code for populating a vacancy data structure corresponding to the selected congested network route section, wherein the vacancy data structure stores available track information of a set of network route sections and wherein the available track information is indexed by a distance between the selected congested network route section and another network route section in the set of network route sections;

computer usable code for selecting a subset of the set of the congesting devices; and computer usable code for rerouting the subset of the set of the congesting devices to a candidate network route section identified in the vacancy data structure.

18. The data processing system of claim 17, wherein the rerouting the subset omits evaluating a possibility of moving a congesting device in the subset to a neighboring network route section of the selected congested network route section because the neighboring network route section is not identified in the vacancy data structure, further comprising:

computer usable code for rerouting a second subset of the set of the congesting devices to a second candidate network route section identified in the vacancy data structure.

19. The data processing system of claim 17, further comprising:

computer usable code for determining whether a congesting device in the subset is causing congestion in a network route section neighboring the selected congested network route section; and computer usable code for skipping, responsive to the determining being affirmative, the network route section neighboring the selected congested network route section for the rerouting.

20. The data processing system of claim 17, wherein the populating comprises:

computer usable code for identifying, in the vacancy data structure, the candidate network route section neighboring the selected congested network route section such that a direction of the candidate network route section relative to the selected congested network route section corresponds to an orientation of the selected congested network route section;

computer usable code for recording in the vacancy data structure a distance between the candidate network route section and the selected congested network route section; and computer usable code for recording in the vacancy data structure a number of available empty tracks in the candidate network route section.

* * * * *